US008010640B2

(12) United States Patent
Aune et al.

(10) Patent No.: US 8,010,640 B2

(45) Date of Patent: Aug. 30, 2011

(54) SYSTEMS AND METHODS FOR AUTO-CONFIGURATION OF A GENERIC DATA DEVICE COUPLED TO A UTILITY METER ON A WIRELESS NETWORK

(75) Inventors: Mark Kristian Aune, New Orleans, LA (US); Brian R. Garrison, Madison, MI (US); John C. Henderson, Madison, MI (US)

(73) Assignee: SmartSynch, Inc., Jackson, MS (US)

( * ) Notice: Subject to any disclaimer, the term of this patent is extended or adjusted under 35 U.S.C. 154(b) by 521 days.

(21) Appl. No.: 11/934,331

(22) Filed: Nov. 2, 2007

(65) Prior Publication Data

US 2008/0109537 A1 May 8, 2008

Related U.S. Application Data

(60) Provisional application No. 60/864,196, filed on Nov. 3, 2006.

(51) Int. Cl.

| | |
|---|---|
| ***G06F 15/177*** | (2006.01) |
| ***G06F 19/00*** | (2011.01) |
| ***G05D 3/12*** | (2006.01) |
| ***G01R 21/00*** | (2006.01) |

(52) U.S. Cl. .......... 709/222; 709/220; 702/62; 700/107; 700/286

(58) Field of Classification Search .................. 709/220, 709/222, 217, 219; 700/107, 108, 116, 291, 700/295, 286; 705/63, 29, 412; 340/870.02, 340/637; 455/558, 418–420; 702/62

See application file for complete search history.

(56) References Cited

U.S. PATENT DOCUMENTS

| | | | | |
|---|---|---|---|---|
| 6,088,659 | A * | 7/2000 | Kelley et al. | 702/62 |
| 6,134,441 | A * | 10/2000 | Astrom et al. | 455/445 |
| 6,618,709 | B1 * | 9/2003 | Sneeringer | 705/412 |
| 6,961,567 | B1 * | 11/2005 | Kuhn | 455/435.1 |
| 6,980,973 | B1 * | 12/2005 | Karpenko | 705/412 |
| 7,009,530 | B2 * | 3/2006 | Zigdon et al. | 340/870.02 |
| 7,149,792 | B1 * | 12/2006 | Hansen et al. | 709/220 |
| 7,171,374 | B1 * | 1/2007 | Sheehan et al. | 705/8 |
| 2005/0033701 | A1 * | 2/2005 | Challener et al. | 705/63 |
| 2007/0011301 | A1 * | 1/2007 | Ong et al. | 709/224 |
| 2007/0055640 | A1 * | 3/2007 | Dababneh et al. | 705/412 |
| 2007/0169075 | A1 * | 7/2007 | Lill et al. | 717/168 |
| 2007/0254711 | A1 * | 11/2007 | Young et al. | 455/558 |
| 2007/0268516 | A1 * | 11/2007 | Bugwadia et al. | 358/1.15 |
| 2008/0051077 | A1 * | 2/2008 | Vitorino | 455/423 |
| 2008/0117077 | A1 * | 5/2008 | Ratiu et al. | 340/870.02 |

* cited by examiner

*Primary Examiner* — Gregory G Todd

(74) *Attorney, Agent, or Firm* — Morris, Manning & Martin, LLP; John R. Harris

(57) ABSTRACT

Systems and methods are provided for the automatic configuration of digital utility meters. One embodiment provides for pre-producing digital devices, the digital devices comprising integrated module components, configured for communication with a data management system via a wireless network and further configured for monitoring capability, producing a list file associated with the digital devices and including identities for each integrated module component, activating a digital devices using the wireless network, and distributing deployment information to the digital device from at least one configuration server via the wireless network, including customer data for configuring the digital device and for registering the digital device with a transaction management system.

64 Claims, 5 Drawing Sheets

100
Customer 10
Digital Device 22
Registration Data
26 Customer Communications Server
Configuration Data
42 Activation File
Customer PO 28
40 Activation Request
40 Activation Request
24 Carrier Activation Server
Activation File 42
42 Activation File
Application 12
Order File 30
20 Configuration Server
Local Operation Server 18
36 Work Order
46 Ship File
46 Ship File
Supplier File 38
32 Mod PO
34 Device PO
44 RMA File
14 Component Production Server
38 Supplier File
16 Device Manufacturer Server

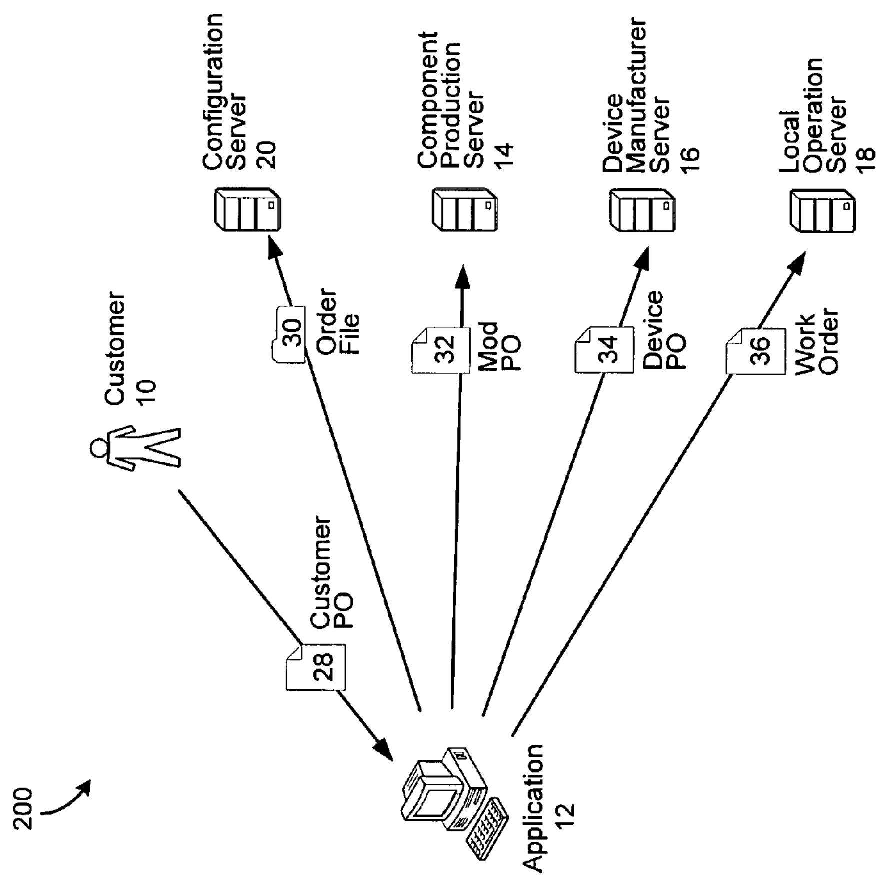
FIG. 2 – PRE-PRODUCTION

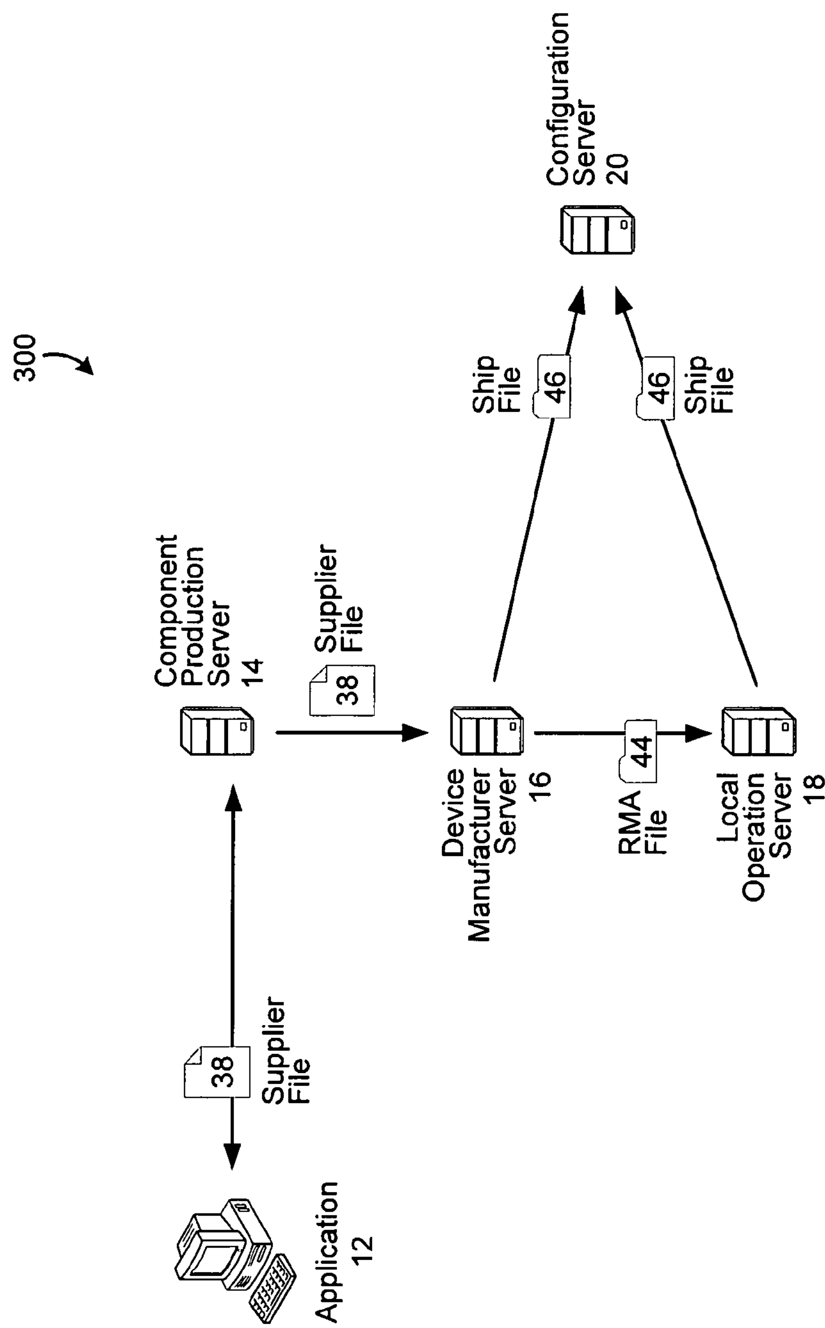
FIG. 3 - PRODUCTION

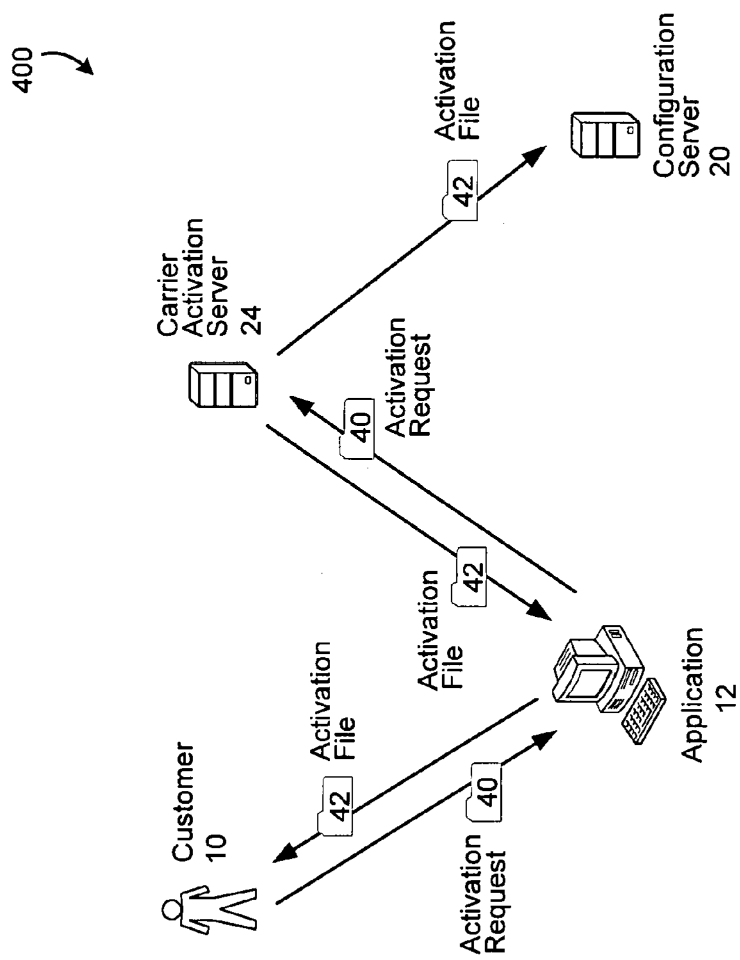
FIG. 4 - ACTIVATION

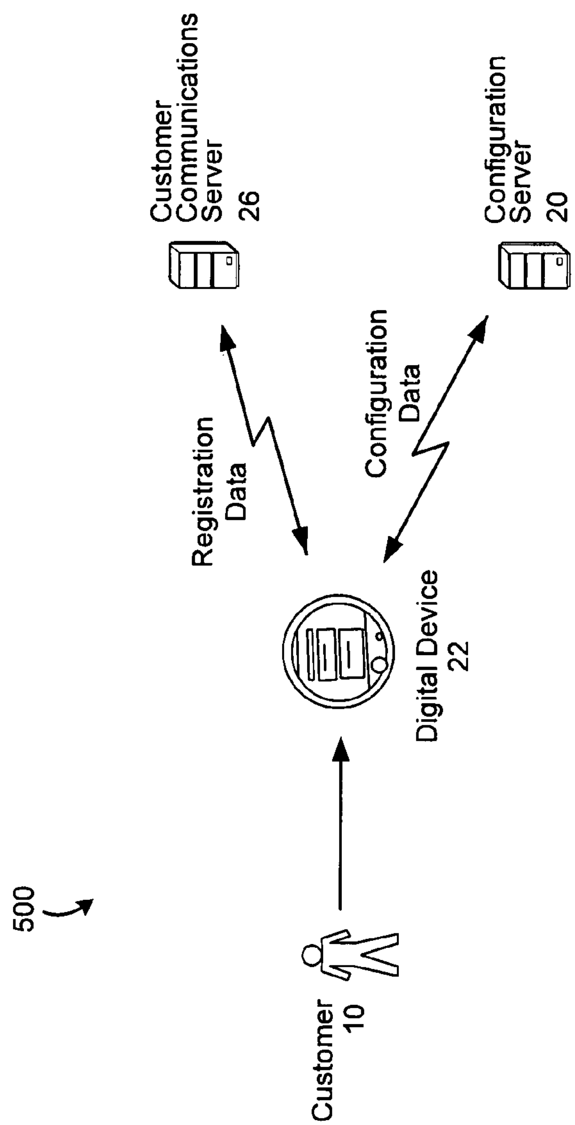
FIG. 5 - DEPLOYMENT

SYSTEMS AND METHODS FOR AUTO-CONFIGURATION OF A GENERIC DATA DEVICE COUPLED TO A UTILITY METER ON A WIRELESS NETWORK

CROSS-REFERENCE TO RELATED APPLICATIONS

This application claims the benefit under 35 U.S.C. §119 (e) of U.S. Provisional Patent Application Ser. No. 60/864, 196, entitled "Systems and Methods for Auto-Configuration of a Generic Data Device on a Wireless Network," filed Nov. 3, 2006, which is incorporated herein by reference as if set forth herein in its entirety.

TECHNICAL FIELD

The present invention relates generally to electricity meters, and more particularly, to utilizing radio-based telemetry for communications between data management systems and remote sensors or data devices.

BACKGROUND

Wireless data devices are usually pre-programmed with customer configuration information at the time of manufacturing or delivery. This includes such information as unique serial identifiers of the device, messaging destinations (e.g., IP addresses), wireless carrier networks, device passwords or encryption keys, clock settings, calendar settings, time zone settings, embedded software applications and/or updates, and device phone numbers. If appropriate for the wireless technology used, i.e., cellular devices are one example, among others, the devices sometimes also include active or inactive SIM cards.

SUMMARY

The present invention provides systems and methods for automatic configuration of distributed digital devices that utilize wireless communication. One embodiment provides a method for automatic configuration of digital devices, comprising: pre-producing digital devices comprising integrated module components configured for communication with a data management system via a wireless network and further configured for monitoring capability, producing a list file associated with the digital devices and including identities for each integrated module component, activating a digital device using the wireless network, and distributing deployment information to the digital device from at least one configuration server via the wireless network, further including customer data for configuring the digital device and for registering the digital device with a transaction management system.

Another embodiment provides a system for automatic configuration of digital devices, comprising: a pre-production server configured for receiving a request for the digital devices from a customer, creating a customer profile, submitting a request for module components, and committing to manufacture the digital devices integrating the module components; a device manufacture server configured for associating the module components with respective end-users; an activation server configured for activating the digital devices via a wireless network; and a configuration server for distributing deployment information corresponding to the digital devices.

Yet another embodiment provides a system for automatic configuration of digital devices, comprising: a pre-production server configured for receiving a request for the digital devices from a customer, creating a customer profile, submitting a request for module components, and committing to manufacture the digital devices integrating the module components; a device manufacture server configured for associating the digital devices with respective end-users; an activation server configured for activating the digital devices via a wireless network; and a configuration server for distributing deployment information corresponding to the digital devices.

Other systems, methods, features and advantages of the present invention will be or become apparent to one with skill in the art upon examination of the following drawings and detailed description. It is intended that all such additional systems, methods, features and advantages be included within this description and be within the scope of the present disclosure.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2 is a diagram illustrating the pre-production phase of the auto-configuration of a digital device according to FIG. 1.

FIG. 3 is a is a diagram illustrating the production phase of the auto-configuration of a digital device according to FIG. 1.

FIG. 4 is a is a diagram illustrating the activation phase of the auto-configuration of a digital device according to FIG. 1.

FIG. 5 is a is a diagram illustrating the deployment phase of the auto-configuration of a digital device according to FIG. 1.

DETAILED DESCRIPTION

Figure 1:
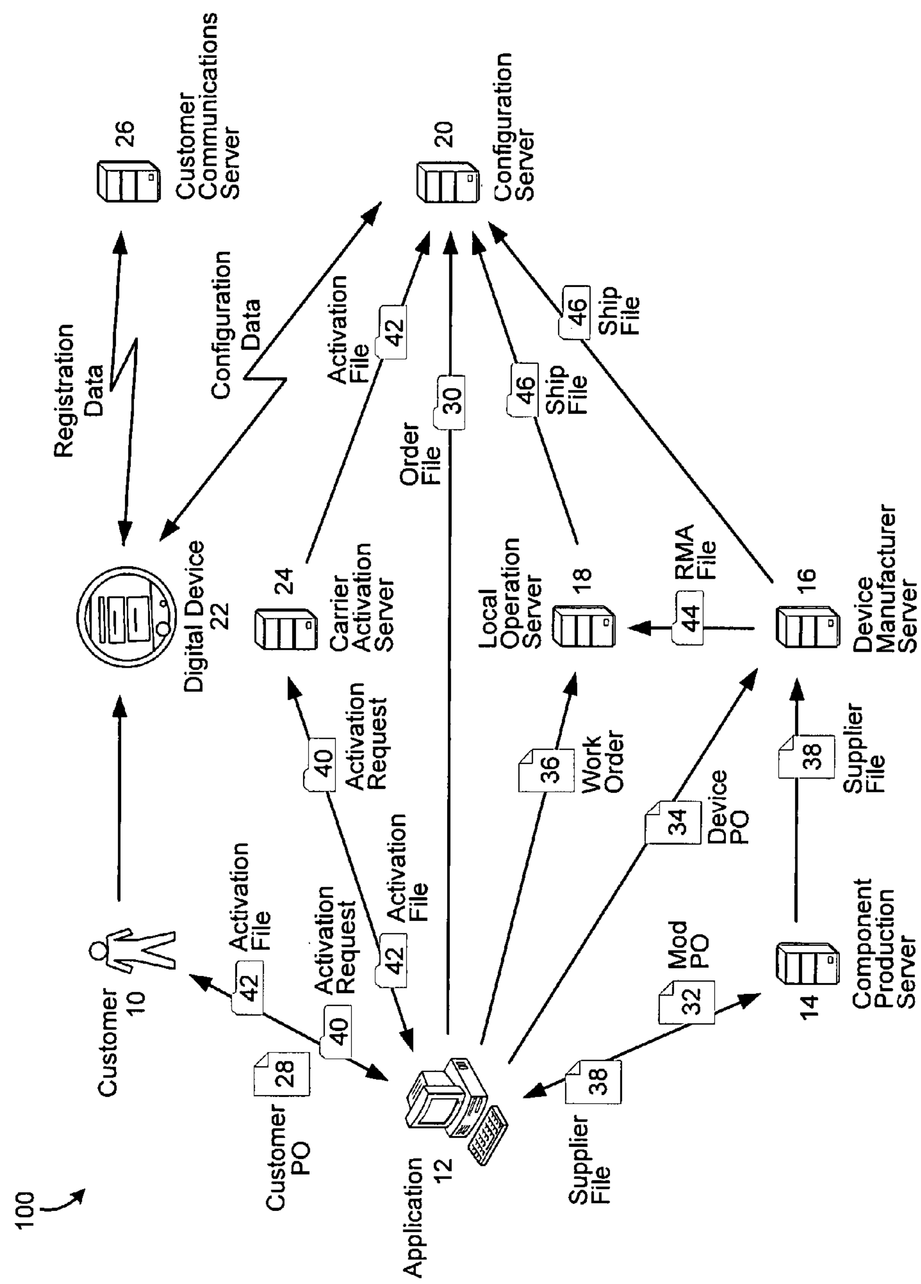
FIG. 1 is a data flow diagram illustrating one embodiment of the auto-configuration of a digital device on a wireless network.

Reference is now made in detail to the description of the embodiments of systems and methods for automatic configuration of a generic digital device on a wireless network as illustrated in the drawings. The invention may, however, be embodied in many different forms and should not be construed as limited to the embodiments set forth herein; rather, these embodiments are intended to convey the scope of the invention to those skilled in the art. Furthermore, all "examples" given herein are intended to be non-limiting.

FIG. 1 is a data flow diagram illustrating a system 100 for the automatic configuration of a utility meter or digital device 22 on a wireless network. One of skill in the art will readily note that other type devices may be configured utilizing the systems and methods described herein.

The diagram in FIG. 1 illustrates a customer 10 having access to an application 12, and the application 12 accessing a component production server 14, a device manufacturer server 16, a local operation server 18, a configuration server 20 and a wireless carrier activation server 24. A digital device 22, such as a digital utility meter for example, is placed by the customer and communicates through a wireless network with the configuration server 20, and also communicates with a customer communications server 26. Various types of purchase orders (PO), files and requests are passed through the system 100 and processed within the application 12 and servers of the system 100. These purchase orders, files, and requests are discussed in greater detail below. Additionally, the status of the digital device 22, i.e., configuration data, may be ascertained by the configuration server 20 through the wireless network.

One embodiment comprises the auto-configuration of a digital device 22, such as a digital utility meter. Advanced utility meters, i.e., electricity meters are one non-limiting example, may use a variety of wireless technologies, such as but not limited to General Packet Radio Service (GPRS) based telemetry, to communicate with data management systems to configure various monitoring functions (monitoring of power usage, etc.), carry out load control, meter activation and deactivation, serve as a communications conduit to other devices in the area, or meter data acquisition for both residential and commercial applications. It should be noted that technologies such as CDMA, WiFi, and WiMAX, among others, could also be utilized by advanced electricity meters or other digital devices.

Implementation of a central configuration server concept allows manufactured or off-the-shelf devices to be predefined, for example, in a database, with the customer's unique identity information based, for example, on a sales order or sales receipt. An order can be filled with a generically manufactured digital device 22. Once a digital device 22 is powered on for the first time, it contacts a central configuration server 20 and receives configuration data and other customer-unique programming via a wireless network. Since wireless data devices need not be preconfigured at a factory or sales office, increased flexibility in the manufacture, distribution and activation of the digital devices 22 is attained.

Typically, the digital device 22 may also contact the central configuration server 20 during normal operations. Function and feature upgrades are also provided via the wireless network, as well as deactivation or reassignment to a new or different customer 10.

One embodiment of a method for automatic configuration of a digital device 22 on a wireless network is meter programming, activation and deployment (MPAD), as illustrated in FIG. 1. The MPAD process data flow is composed of (1) a pre-production phase (FIG. 2), (2) a production phase (FIG. 3), (3) an activation phase (FIG. 4) and (4) a deployment phase (FIG. 5), each of which is further described below.

A customer 10 typically submits a purchase order via a customer PO 28 at application 12. Some activities the customer 10 performs include placing the digital device 22 into operation, performing an activation request 40 from the carrier activation server 24 via the application 12, and receiving the activation file 42 resulting from the activation request 40.

The application 12 is responsible for receiving information from and providing information to the customer 10 regarding the ordering and activation of digital devices 22. Among other functionalities, the application 12 is configured for receiving and processing orders, creating a customer profile as part of an order file 30, submitting purchase orders to the component production server 14, the device manufacturer server 16, and the local operation server 18. Additionally, the application 12 performs activation requests 40 from the carrier activation server 24 on behalf of the customer 10.

The component production server 14 ensures that sufficient inventory of components are available for manufacturing digital devices 22. Additionally, the component production server 14 generates a supplier file 38 that identifies the components designated for integration into a digital device 22.

The device manufacturer server 16 performs the integration of the components to manufacture digital devices 22. The components designated and/or requested by the component production server 14 are combined to produce the digital devices 22. The device manufacturer server 16 generates a ship file 46 identifying the digital devices 22 shipped, for example, from the device manufacturer server 16 to a utility customer.

It should be noted that the integration of the components could also be sourced out to a third party or assembled locally. In this instance, a local operations server 18 performs the integration of the components to manufacture the digital devices 22, and also generates a ship file 46 identifying the digital devices 22 provided.

The configuration server 20 receives information identifying the customer 10, the digital devices 22, activation, and allows for over-the-air activation and programming of the digital devices 22. A configuration server 20 can exist as an array of servers allowing for configuration of a large number of digital devices 22 simultaneously.

The digital device 22 is a data device such as, for example, a digital utility meter. One example of a digital device 22 is an Itron CENTRON GPRS SmartMeter device manufactured by SmartSynch, Inc. Advanced electricity meters can use wireless technologies and can communicate with data management systems to configure power monitoring functions, carry out load control, meter activation and deactivation, serve as a communications conduit to other devices, and allow for meter data acquisition in residential and commercial applications. It will be readily understood by those of skill in the art, that a digital device 22 is not limited to electricity meters, but rather is also applicable for utility meters and other devices that require, for example, monitoring functions, device control, device activation and deactivation, and for communications with other devices.

The carrier activation server 24 receives customer requests for activation of digital devices 22. Typically, a customer 10 would request activation of one or more integrated circuit card IDs (ICCID). Activation information is transmitted back to the customer 10 in an activation file 42, and is also loaded into the configuration server 20 where it is typically stored in a database.

An activated digital device 22 typically registers with a customer communications server 26, such as for example, a customer transaction management. Customers 10 can then communicate with digital devices 22 to acquire status and other information as well as programming the digital devices 22.

FIG. 2 illustrates the pre-production phase 200 relating to sales and ordering activities, loading customer information and the manufacture of module components for the digital device 22. The pre-production phase 200 typically involves a customer 10 submitting a request or customer PO 28, for example a purchase order, for a digital device 22 such as, for example a digital utility meter. One example of a digital device 22 is an Itron CENTRON GPRS Smart Meter device manufactured by SmartSynch, Inc. The customer PO 28 is submitted using the application 12.

After receiving the customer PO 28 requesting a digital device 22, the application 12 creates a customer profile. The customer profile identifies the customer 10 and defines relevant points of contact such as, for example, encryption keys and transaction management system (TMS) destination addresses, among others. The customer profile becomes part of an order file 30 that is sent to the configuration server 20.

After creating the customer profile, the application 12 submits a request for module components by sending a mod PO 32 (module purchase order) to the component production server 14. The request could be, for example, a purchase order submitted to a component manufacturer. Module components are integrated into the digital devices 22 by the device manufacturer server 16.

Typically, requests for module components are utilized to ensure that the inventory is sufficient to produce digital devices 22 such as, for example, digital utility meters. If available, the necessary components are designated for the ordered digital devices 22. Of course, if the necessary components are not available, they are procured. The requests are typically based on sales forecasts. Often the requests are fulfilled with previously manufactured digital devices 22 and the automatic configuration process determines the ultimate customer configuration.

Upon designation of the module components, a commitment is made to manufacture digital devices 22 integrating the module components. A device PO 34 (device purchase order) is submitted to a device manufacturer server 16. The device manufacturer server 16 utilizes the components—availability ensured by the component production server 14—to manufacture digital devices 22.

Alternatively, the application 12 need not wait for a customer PO 28, but rather may submit a mod PO 32 based on an estimate, such as a sales projection, to ensure adequate inventory for expected future demand.

It should be noted that some digital devices 22 may already exist in the inventory, having been produced prior to receiving customer requests. For example, a device PO 34 could be submitted to a device manufacturer server 16 to produce integrated digital utility meters such as SmartSynch SmartMeter devices. The components previously requested via the mod PO 32 may then be combined to produce the digital devices 22 (integrated digital utility meters in this instance).

It should be noted also, that the integrations could be sourced out to a third party or assembled locally. A work order 36 would be used to document local activities. For example, in some instances a local operation server 18 is utilized to perform the integration of components into digital devices 22. The application 12 in such an instance, sends a work order 36 to the local operation server 18. Thus, the work order 36 serves to document the integration activities.

FIG. 3 illustrates the production phase 300 providing for the actual manufacture and integration of digital devices 22 such as digital utility meters. For each product delivered, files are generated listing the identities of each integrated component. Alternatively, a file could list the identities of the device itself.

The generated files are imported into a configuration server 20, and the digital devices 22 and/or components are typically associated with a customer 10 having a standing order. Digital devices 22 not associated with a customer 10 are typically placed in storage for future sale.

Files are typically created in XML format and delivered to the configuration server 20 via FTP. Of course, those of skill in the art will recognize that other file formats and delivery methods could be utilized within the scope of the disclosed inventions.

Alternatively, it should also be noted that digital devices 22 could be produced prior to receiving a customer PO 28. In such circumstances, a file still lists the components and identities of the various components of the digital device 22 as well as the identities of the digital device 22 itself. Once an order is received from a customer 10, the digital device 22 and/or components are then associated with a particular customer or customers 10. As noted above, this allows for fulfilling customer orders with generically manufactured digital devices 22.

Additionally, since the digital devices 22 are produced with unique identities, those identities are typically referenced by other components within the system 100. Similarly, the unique identities of individual components within a digital device 22 are typically also referenced by other components within the system 100.

Some exemplary file types for providing component information are a supplier file 38, a ship file 46 and an RMA file 44. Of course, it should be evident that other file types could be utilized within the scope of this invention.

The component production server 14 generates a supplier file 38 identifying the components designated for integration into a digital device 22. The supplier file 38 is provided to the device manufacturer server 16 and is used in the production of digital devices 22. The supplier file 38 includes identifying information for the components that are shipped to the device manufacturer server 16 for integration.

The device manufacturer server 16 integrates the components into digital devices 22 and then generates a ship file 46 that includes identifying information for the digital devices 22 that are manufactured and shipped, for example, to a utility customer. (Although not shown in FIG. 3, a copy of the ship file 46 is also sent to the customer 10 upon order delivery.) After the ship file 46 is imported into the configuration server 20, the digital device 22 has a status designated as 'shipped', for example, in the configuration server.

Information identifying digital devices 22 that fail during integration is included in an RMA file 44. The RMA file 44 is forwarded to a local operations server and such digital devices 22 are typically returned for repair.

Alternatively, a local operation server 18 could assemble digital devices 22 locally from the designated module components. In such an instance, the local operation server 18 generates a ship file 46 that includes identifying information for the digital devices 22 that are assembled locally. The ship file 46, is created in the same manner as by the device manufacturer server 16 above. Similarly, after the ship file 46 is imported into the configuration server 20, the digital device 22 has a status designated as 'shipped', for example, in the configuration server.

FIG. 4 illustrates the activation phase 400 providing for activation of a digital device 22, such as a digital utility meter, on a carrier's wireless network. Activation occurs prior to deploying the digital device 22. Once deployed, the digital device communicates with the configuration server 20 and with a customer communication server 26, such as a TMS.

As shown in FIG. 4, a customer 10 requests activation of a digital device 22 (or group of digital devices) by submitting an activation request 40, for example a customer support form in an application 12. The activation request 40 is submitted by the application 12 to the carrier activation server 24 of the wireless network carrier. For example, a customer 10 would submit an activation request 40 to have an integrated circuit card ID (ICCID) or group of ICCIDs activated. The associated 15-digit mobile station integrated services digital network (MSISDNs) identification number is returned from the carrier activation server 24 of the wireless carrier in an activation file 42. The activation file 42 is sent to the customer 10 and is also loaded into the configuration server 20. Upon importing the activation file 42 into the configuration server 20, the digital device 22 (a digital utility meter in this instance) has a status of 'Activated' in the configuration server.

FIG. 5 illustrates the deployment phase 500 providing for configuration of the digital device 22 via a wireless network. The deployment information may be distributed from the configuration server 20 to multiple destinations utilizing standard and/or customized interfaces. Customer data is provided and the digital device 22 is registered on the customer's data and transaction management system at the customer communications server 26.

As illustrated in FIG. 5, a customer 10 places the digital device 22 in operation in the field. Upon being turned on, or powered up, the digital device 22 performs a network discovery and selection algorithm, performs the appropriate authentication methods for the network to be used, and registers itself over the corresponding wireless network.

Upon initial power-up, the digital device 22 is in a generic pre-configured state. The digital device 22 utilizes a default destination address and encryption key to request customer configuration data from the configuration server 20. The configuration data to be supplied is determined from the supplier file 38, the ship file 46, the activation file 42, and other information as appropriate.

Customer configuration is applied to the digital device 22 by the configuration server 20 passing the customer data (with encryption) to the digital device 22. The configuration server 20 waits for an acknowledgment of receipt by the digital device 22. Upon successful configuration, the digital device 22 shows a status of 'Configured' within the configuration server and thus, the digital device 22 is in a configured state. If configuration of the digital device 22 fails, the status is shown as 'Configuration Failed' in the configuration server and the digital device 22 remains in a pre-configured state.

After successful configuration, the digital device registers on the customer's data and TMS system at the customer communications server 26 by using the customer's destination address and encryption key. Acknowledgment from the customer communications server 26 is passed to the digital device 22 and the digital device status changes to 'Registered'. An acknowledgment is sent from the digital device 22 to the configuration server 20, and the digital device status is changed to 'Registered' in the configuration server. If registration fails, the status of the device is shown as 'Registration Failed' in the configuration server, and the device status remains as 'Configured'.

Upon configuration of the digital device 22, the configuration server 20 may retrieve the customer data, as programmed, from the digital device 22. The data retrieved from the digital device 22 may be compared with the configuration server data, for example, to confirm digital device status. Further, the activities and quality of the deployment process may be managed by utilizing the information derived from the configuration server 20.

As noted above, the configuration server 20 may exist as an array of servers such that a large number of digital devices 22 may be configured simultaneously.

Accordingly, it will be understood that various embodiments of the present invention described herein are preferably implemented as a special purpose or general-purpose computer including various computer hardware as discussed in greater detail below. Embodiments within the scope of the present invention also include computer-readable media for carrying or having computer-executable instructions or data structures stored thereon. Such computer-readable media can be any available media which can be accessed by a general purpose or special purpose computer, or downloadable to through wireless communication networks. By way of example, and not limitation, such computer-readable media can comprise physical storage media such as RAM, ROM, flash memory, EEPROM, CD-ROM, DVD, or other optical disk storage, magnetic disk storage or other magnetic storage devices, any type of removable non-volatile memories such as secure digital (SD), flash memory, memory stick etc., or any other medium which can be used to carry or store computer program code in the form of computer-executable instructions or data structures and which can be accessed by a general purpose or special purpose computer, or a mobile device.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the invention may be implemented. Although not required, the inventions will be described in the general context of computer-executable instructions, such as program modules, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, objects, components, data structures, etc. that perform particular tasks or implement particular abstract data types, within the computer. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Those skilled in the art will also appreciate that the invention may be practiced in network computing environments with many types of computer system configurations, including personal computers, hand-held devices, multi-processor systems, microprocessor-based or programmable consumer electronics, networked PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the inventions, which is not illustrated, includes a general purpose computing device in the form of a conventional computer, including a processing unit, a system memory, and a system bus that couples various system components including the system memory to the processing unit. The computer will typically include one or more magnetic hard disk drives (also called "data stores" or "data storage" or other names) for reading from and writing to. The drives and their associated computer-readable media provide nonvolatile storage of computer-executable instructions, data structures, program modules, and other data for the computer. Although the exemplary environment described herein employs a magnetic hard disk, a removable magnetic disk, removable optical disks, other types of computer readable media for storing data can be used, including magnetic cassettes, flash memory cards, digital video disks (DVDs), Bernoulli cartridges, RAMs, ROMs, and the like.

Computer program code that implements most of the functionality described herein typically comprises one or more program modules may be stored on the hard disk or other storage medium. This program code, as is known to those skilled in the art, usually includes an operating system, one or more application programs, other program modules, and program data. A user may enter commands and information into the computer through keyboard, pointing device, or other input devices (not shown), such as a microphone, game pad, satellite dish, scanner, or the like. These and other input devices are often connected to the processing unit through known electrical, optical, or wireless connections.

The main computer that affects many aspects of the inventions will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), and wireless LANs (WLAN) that are presented here by way of example and not limitation. Such networking environments are commonplace in office-wide or enterprise-wide computer networks, intranets and the Internet.

When used in a LAN or WLAN networking environment, the main computer system implementing aspects of the invention is connected to the local network through a network interface or adapter. When used in a WAN or WLAN networking environment, the computer may include a modem, a wireless link, or other means for establishing communications over the wide area network, such as the Internet. In a networked environment, program modules depicted relative to the computer, or portions thereof, may be stored in a remote memory storage device. It will be appreciated that the network connections described or shown are exemplary and other means of establishing communications over wide area networks or the Internet may be used.

In view of the foregoing detailed description of preferred embodiments of the present invention, it readily will be understood by those persons skilled in the art that the present invention is susceptible to broad utility and application. While various aspects have been described in the context of a preferred embodiment, additional aspects, features, and methodologies of the present invention will be readily discernable therefrom. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the present inventions. In addition, some steps may be carried out simultaneously. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

What is claimed is:

1. A method for automatic configuration of wirelessly communicating remotely deployed digital devices within a particular carrier's wireless network on behalf of a utility company customer that uses configured digital devices to receive information collected by equipment operatively connected to configured digital devices and to provide commands to equipment operatively connected to the configured digital devices via a customer data management system, the digital devices communicating with the customer data management system upon activation on and via the particular carrier's wireless network, comprising:

providing a configuration server for storing configuration information associated with the unconfigured digital devices in association with (a) customer information, (b) device status information, and (c) wireless network activation information corresponding to parameters for digital devices required for communications by the digital devices on the particular carrier's wireless network;

providing a plurality of unconfigured digital devices, comprising integrated module components, configured for default communication with the configuration server but not the customer data management system via the particular carrier's wireless network;

providing a list file to the configuration server, the list file associated with the plurality of unconfigured digital devices and including customer profile information for each integrated module component corresponding to a network address for the customer data management system;

activating an unconfigured digital device, from the plurality of digital devices, for operation on the particular carrier's wireless network;

recording a status of the unconfigured digital device to "activated" in the device status information in the stored configuration information;

upon power-up of the unconfigured device in within the particular carrier's wireless network, receiving at the configuration server a request from the unconfigured digital device for configuration data via the particular carrier's wireless network;

providing configuration information to the unconfigured digital device from the configuration server via the wireless network, the configuration information including customer data for configuring the unconfigured digital device and the network address for registering the digital device for communications with the customer data management system;

in response to successful receipt of the configuration information from the configuration server by the unconfigured digital device, changing the status of the unconfigured digital device to "configured" in the device status information in the stored configuration information;

receiving a "registered" communication at the configuration server from the customer data management system indicating that a configured digital device has successfully communicated with the customer data management system to register for operations; and in response to receipt of the "registered" communication, changing the status of the digital device to "registered" in the device status information in the stored configuration information, wherein the digital devices are coupled to utility meters, whereby an unconfigured digital device is remotely activated and configured for communications and operations with the customer data management system via the particular carrier's wireless network.

2. The method of claim 1, the providing of unconfigured digital devices initiated by a request from a utility company customer for the digital devices.

3. The method of claim 2, further comprising creating a utility company customer profile, the customer profile including customer identification, encryption keys and destination addresses for communications by the digital devices with the customer data management system.

4. The method of claim 1, further comprising requesting a plurality of module components that are necessary for manufacture of the digital devices.

5. The method of claim 4, further comprising committing to manufacture of the digital devices that integrate the plurality of module components.

6. The method of claim 1, wherein the digital devices are telemetry devices.

7. The method of claim 1, wherein the utility meters are electric meters.

8. The method of claim 1, wherein the digital devices include monitoring capability such as power monitoring functions for an electrical utility.

9. The method of claim 1, wherein the step of activating comprises receiving a request from a utility company customer for activation of at least one integrated circuit card ID (ICCID) provided on an unconfigured digital device.

10. The method of claim 1, wherein the step of activating comprises transmitting an associated 15-digit mobile station integrated services digital network (MSISDN) identification number to a utility company customer in an activation file and imported to the configuration server.

11. The method of claim 1, wherein the step of providing configuration information uses standard interfaces.

12. The method of claim 1, wherein the step of providing configuration information uses customized interfaces.

13. The method of claim 1, further comprising the step of retrieving utility company customer data and status information from the digital device by the configuration server.

14. The method of claim 1, wherein the step of providing configuration information comprises requesting configuration data from the configuration server.

15. A method for automatic configuration of an unconfigured wireless device on behalf of a utility company customer that uses a configured wireless device to communicate with a customer data management system, the configured wireless device communicating with the customer data management system upon activation on and using a particular carrier's wireless network, comprising:

providing the initially unconfigured wireless device not containing customer-specific programming information for deployment by the customer;

providing a configuration server for storing configuration information for the wireless device in association with customer information, status information, and customer-specific programming information;

providing a customer computer program application for use by a personnel associated with the customer, the application coupled to the configuration server and to a carrier activation server;

in response to receipt of information by the customer personnel via the application, storing customer profile information at the configuration server comprising customer identification information, an encryption key for the customer, and a network destination address for the customer data management system;

at the configuration server, receiving information from the application corresponding to an indication by the customer personnel of activation of an unconfigured wireless device;

communicating an activation request from the customer application to the carrier activation server so that the particular carrier will allow the device to operate within the particular carrier's wireless network upon power-up;

receiving an activation file at the configuration server from the carrier activation server, the activation file comprising identification information corresponding to the unconfigured wireless device that the customer personnel has indicated as activated;

in response to receipt of the activation file at the configuration server, recording the status of the unconfigured wireless device as "activated" in the status information in the stored configuration information;

receiving a request for configuration information at the configuration server from the activated wireless device upon startup of the wireless device within an area of coverage of the particular carrier's wireless network;

in response to receipt of the request for configuration information from the activated wireless device, providing configuration information from the customer profile information to the activated wireless device from the configuration server corresponding to the wireless device and including customer-specific programming information;

in response to receipt at the configuration server of an acknowledgement of the configuration information provided by the activated wireless device, recording the status of the activated wireless device as "configured" in the status information; and in response to receipt at the configuration server of a registration message associated with the configured wireless device, recording the status of configured wireless device as "registered" in the status information, wherein the wireless device is coupled to a utility meter, whereby a configured wireless device having a "registered" status thereafter communicates with the customer data management system via the carrier's wireless network after having been automatically configured.

16. The method of claim 15, wherein the unconfigured wireless device includes a default network destination address for initial communications with the configuration server and a default encryption key for communications with the configuration server.

17. The method of claim 15, wherein the utility company customer uses the registered wireless device to communicate with equipment in the field coupled to the wireless device.

18. The method of claim 15, wherein the configuration information includes a network destination address of the customer data management system and a customer encryption key for communications between the wireless device and the customer data management system.

19. The method of claim 18, wherein the wireless device communicates with the customer data management system using the customer encryption key for subsequent communications between the wireless device and the customer data management system.

20. The method of claim 15, wherein customer computer program application is operative for receiving input from customer personnel for ordering and activation of a wireless device.

21. The method of claim 20, wherein the computer program application provides an order file containing a customer profile to the configuration server, the customer profile comprising customer identification information, a customer encryption key, and a network destination address of the customer data management system.

22. The method of claim 20, further comprising the step of providing a device manufacturer server for receiving ordering information from the computer program application relating to ordering and activation of an unconfigured wireless device, the device manufacturer server providing a customer profile to the configuration server for use as configuration information.

23. The method of claim 20, wherein the computer program application is operative for providing a request for module components used in the wireless device to a component production server used in connection with manufacturing the wireless device.

24. The method of claim 23, wherein the component production server provides a file listing components in a manufactured wireless device to the configuration server for use as configuration information.

25. The method of claim 23, wherein the component production server provides a ship file comprising information about wireless devices shipped to a customer to the configuration server for use as configuration information.

26. The method of claim 15, wherein the activation file comprises identification information corresponding to an activated wireless device.

27. The method of claim 26, wherein the identification information comprises an MSISDN.

28. The method of claim 15, wherein the activation request by a customer from the application corresponds to a particular integrated circuit card ID (ICCID).

29. The method of claim 15, wherein the unconfigured wireless device upon powerup authenticates itself to the wireless carrier, and then uses the default network destination address and encryption key to request configuration information from the configuration server.

30. The method of claim 15, wherein the configuration information is derived from one or more of an order file component supplier file, a ship file, an activation file, a customer network destination address, a customer encryption key.

31. The method of claim 15, further comprising the step of recording the status of an "activated" wireless device as "configuration failed" in the status information for the wireless device in the event that the activated wireless device provided a request for configuration information but did not provide an acknowledgement of the configuration information provided by the configuration server.

32. The method of claim 15, wherein a wireless device having a "registered" status communicates with the customer data management system at the customer network destination address using the customer encryption key.

33. The method of claim 15, wherein the registration message is provided from the wireless device to the configuration server.

34. The method of claim 15, further comprising the step of recording the status of a configured wireless device as "registration failed" in the event that the configuration server does not receive a registration message.

35. The method of claim 15, further comprising the step of retrieving customer data from a wireless device via the configuration server.

36. The method of claim 15, further comprising the step of comparing data retrieved from a wireless device to prestored configuration information to confirm the status of the wireless device.

37. The method of claim 15, wherein the wireless device is used for functions selected from the group comprising: load control, meter activation and deactivation, a communications conduit for other devices in the area, meter data acquisition for both residential and commercial applications.

38. The method of claim 15, wherein the particular carrier's wireless network is selected from the group comprising: CDMA, WiFi, WiMax, GPRS.

39. The method of claim 15, wherein the wireless device is used in connection with meter programming, activation, and deployment (MPAD).

40. A system for automatic configuration of an unconfigured wireless device on behalf of a utility company customer that uses a configured wireless device to communicate with a customer data management system, the configured wireless device communicating with the customer data management system upon activation on and using a particular carrier's wireless network, comprising:

a configuration server for storing configuration information for the wireless device in association with customer information, status information, and customer-specific programming information;

a network connection between the configuration server and a computer associated with the customer for use by the customer's personnel;

a network connection between the configuration server and a carrier activation server;

a network connection between the carrier activation server and a computer program application provided for customer use in ordering and activating wireless devices;

a customer computer program application for use by personnel associated with the customer, the application coupled via the network connections to the configuration server and to the carrier activation server;

the computer program application operative, in response to receipt of information input by the customer personnel, to store customer profile information at the configuration server comprising customer identification information, an encryption key for the customer, and a network destination address for a customer data management system;

the customer computer program application further operative to communicate an activation request from the application to the carrier activation server so that the wireless device is enabled for operation within the wireless carrier's network upon power-up;

the configuration server operative to:

receive information from the application corresponding to an indication by the customer personnel of activation of an unconfigured wireless device;

receive an activation file from the carrier activation server, the activation file comprising identification information corresponding to an unconfigured wireless device that the customer personnel has indicated as activated;

in response to receipt of the activation file, record the status of the wireless device as "activated" in the status information in the stored configuration information;

receive a request for configuration information from the activated wireless device upon startup of the wireless device within an area of coverage of the particular carrier's wireless network;

in response to receipt of the request for configuration information from the activated wireless device, provide configuration information to the activated wireless device corresponding to the wireless device and including customer-specific programming information;

in response to receipt at the configuration server of an acknowledgement of the configuration information provided by a activated wireless device, record the status of the activated wireless device as "configured" in the status information; and in response to receipt of a registration message at the configuration server associated with the configured wireless device, record the status of wireless device as "registered" in the status information, wherein the wireless devices are coupled to utility meters, whereby a wireless device having a "registered" status thereafter communicates with the customer data management system via the carrier's wireless network after having been automatically configured.

41. The system of claim 40, wherein the unconfigured wireless device includes a default network destination address for initial communications with the configuration server and a default encryption key for communications with the configuration server, the unconfigured wireless device not containing customer-specific programming information.

42. The system of claim 40, wherein the customer uses the registered wireless device to communicate with equipment in the field coupled to the wireless device.

43. The system of claim 40, wherein the configuration information includes a network destination address of the customer data management system and a customer encryption key for communications between the wireless device and the customer data management system.

44. The system of claim 43, wherein the wireless device communicates with the customer data management system using the customer encryption key for subsequent communications between the wireless device and the customer data management system.

45. The system of claim 40, wherein the customer computer program application is operative for receiving input from customer personnel for ordering and activation of a wireless device.

46. The system of claim 45, wherein the customer computer program application provides an order file containing a customer profile to the configuration server, the customer profile comprising customer identification information, a customer encryption key, and a network destination address of the customer data management system.

47. The system of claim 45, further comprising a device manufacturer server for receiving ordering information from the customer computer program application relating to ordering and activation of an unconfigured wireless device, the device manufacturer server providing a customer profile to the configuration server for use as configuration information.

48. The system of claim 45, further comprising a component production server used in connection with manufacturing the wireless device, and wherein the customer computer program application is operative for providing a request for module components used in the wireless device to the component production server.

49. The system of claim 48, wherein the component production server provides a file listing components in a manufactured wireless device to the configuration server for use as configuration information.

50. The system of claim 48, wherein the component production server provides a ship file comprising information about wireless devices shipped to a customer to the configuration server for use as configuration information.

51. The system of claim 40, wherein the activation file comprises identification information corresponding to an activated wireless device.

52. The system of claim 51, wherein the identification information comprises an MSISDN.

53. The system of claim 40, wherein the activation request by a customer from the application corresponds to a particular integrated circuit card ID (ICCID).

54. The system of claim 40, wherein the unconfigured wireless device upon powerup authenticates itself to the wireless carrier, and then uses a default network destination address and encryption key to request configuration information from the configuration server.

55. The system of claim 40, wherein the configuration information is derived from one or more of an order file component supplier file, a ship file, an activation file, a customer network destination address, a customer encryption key.

56. The system of claim 40, wherein the configuration server is further operative to record the status of an "activated" wireless device as "configuration failed" in the status information for the wireless device in the event that the activated wireless device provided a request for configuration information but did not provide an acknowledgement of the configuration information provided by the configuration server.

57. The system of claim 40, wherein a wireless device having a "registered" status communicates with the customer data management system at the customer network destination address using the customer encryption key.

58. The system of claim 40, wherein the registration message is provided from the wireless device to the configuration server.

59. The system of claim 40, wherein the configuration server is further operative to record the status of a configured wireless device as "registration failed" in the event that the configuration server does not receive a registration message.

60. The system of claim 59, wherein the configuration server is further operative to compare data retrieved from a wireless device to prestored configuration information to confirm the status of the wireless device.

61. The system of claim 40, wherein the configuration server is further operative to retrieve customer data from a wireless device via the configuration server.

62. The system of claim 40, wherein the wireless device is used for functions selected from the group comprising: load control, meter activation and deactivation, a communications conduit for other devices in the area, meter data acquisition for both residential and commercial applications.

63. The system of claim 40, wherein the particular carrier's wireless network is selected from the group comprising: CDMA, WiFi, WiMax, GPRS.

64. The system of claim 40, wherein the wireless device is used in connection with meter programming, activation, and deployment (MPAD).

* * * * *